United States Patent
Chu

(10) Patent No.: US 6,857,662 B2
(45) Date of Patent: Feb. 22, 2005

(54) ADAPTER DEVICE FOR SOLIDLY COUPLING PIPES TOGETHER

(76) Inventor: Chun-Chung Chu, No. 42, Chong Der 5th Road, Taichung (TW), 406

(*) Notice: Subject to any disclaimer, the term of this patent is extended or adjusted under 35 U.S.C. 154(b) by 64 days.

(21) Appl. No.: 10/321,247

(22) Filed: Dec. 17, 2002

(65) Prior Publication Data

US 2003/0102663 A1 Jun. 5, 2003

Related U.S. Application Data

(63) Continuation-in-part of application No. 09/998,163, filed on Dec. 3, 2001, now abandoned.

(51) Int. Cl.⁷ ............................................... F16L 35/00
(52) U.S. Cl. ........................ 285/24; 285/32; 285/420
(58) Field of Search ........................... 285/420, 23, 19, 285/24, 26, 32, 38, 92, 114, 307

(56) References Cited

U.S. PATENT DOCUMENTS

| 2,484,755 A | 10/1949 | Smith |
| 4,108,474 A | 8/1978 | Sigrist ........................ 285/12 |
| 4,625,999 A | * 12/1986 | Valentine et al. ............ 285/24 |
| 5,220,810 A | 6/1993 | Kelther ....................... 62/292 |

* cited by examiner

Primary Examiner—David Bochna
(74) Attorney, Agent, or Firm—Charles E. Baxley

(57) ABSTRACT

An adapter device includes a bracket having a wall and a fence extended from a base panel, the fence includes an opening formed by two arms for receiving a pipe, a tube is threaded to the wall and has one end movable toward and away from the fence. One or more plugs are selectively engaged between the tube and the pipe for making a tight seal between the tube and the pipe. One or more of the plugs may include a blind structure to block the tube and the pipe, or may include an orifice for communicating the tube and the pipe with each other.

10 Claims, 3 Drawing Sheets

ADAPTER DEVICE FOR SOLIDLY COUPLING PIPES TOGETHER

The present invention is a continuation-in-part of U.S. patent application Ser. No. 09/998,163, filed on Dec. 3, 2001, to be abandoned.

BACKGROUND OF THE INVENTION

1. Field of the Invention

The present invention relates to an adapter device, and more particularly to an adapter device for readily and solidly coupling pipes or hoses together.

2. Description of the Prior Art

Typical adapter devices have been developed for coupling pipes together, particularly for coupling hoses or pipes of air pump devices, or of refrigerant recovery systems or the like together.

U.S. Pat. No. 2,484,755 to Smith discloses a yoke having two upturned ends for coupling to two spuds of a meter with molded bushings and the like. However, the yoke may be used for retaining or securing the meter therein only, and may not be used for coupling various pipes together.

U.S. Pat. No. 4,108,474 to Sigrist discloses a fixation clamp for air pump hose, and comprises an air pump hose to be coupled to a threaded tube with connecting pieces and with two clamp halves of the fixation clamp. However, the end pieces or the connecting pieces of the air pump hose and the threaded tube may only be biased together with a spring member, and may not be solidly forced together, such that the hose and the tube may not be used in highly pressurized air pump devices, or refrigerant recovery systems or the like.

U.S. Pat. No. 5,220,810 to Keltner discloses a flushing adapter apparatus for refrigerant recovery system, and comprises a pair of locking bars pivotally secured to a pair of elongate bar members, and each having a tab for receiving tubes or the like. However, the locking bars may be rotated relative to the elongate bar members, such that the pipes or the like may not be solidly retained by the tabs.

In the typical air pump facilities, refrigerant recovery systems, particularly the typical coolant circulating systems or air conditioning systems of vehicles, a piping system is provided and includes a number of hoses or pipes that are required to be coupled together or coupled to various parts or elements, with fasteners or connectors, for receiving coolant, air, or the like.

After using, the tubes and hoses of the piping system are required to be cleaned frequently, in order to remove dirt or residuals from the piping system. Some of the fasteners or connectors are required to be unthreaded and coupled to cleaning systems that may supply cleaning agents and/or water into the piping system. However, the above-described adapters may not be used for easily and quickly coupling the hoses or pipes of the piping system together. In addition, the tubes or hoses of the piping system may not be blocked selectively for testing or measuring the pressure in the piping system.

The present invention has arisen to mitigate and/or obviate the afore-described disadvantages of the conventional adapter devices.

SUMMARY OF THE INVENTION

The primary objective of the present invention is to provide an adapter device for readily and solidly coupling pipes or hoses together and for receiving cleaning agents and/or water therein.

The other objective of the present invention is to provide an adapter device for selectively blocking the pipes or hoses, and for testing or measuring the pressure in the pipes or hoses.

In accordance with one aspect of the invention, there is provided an adapter device comprising a bracket including a base panel having a wall and a fence extended therefrom, the fence of the bracket including an opening formed therein and defined by two arms, a tube threaded to the wall of the bracket, and including a first end located between the wall and the fence, and movable toward and away from the fence when the tube is rotated relative to the wall of the bracket, the tube including a bore formed therein, a pipe engaged in the opening of the fence, and including a stop provided thereon for engaging with the fence and for positioning the pipe to the fence of the bracket, the pipe including a bore formed therein, and a plug selectively engaged between the tube and the pipe, and to be secured between the tube and the pipe when the tube is rotated and moved toward the pipe. The pipe may be quickly and easily positioned and secured to the bracket, and the plug may be solidly engaged between the tube or the pipe for making either a water tight seal or an air tight seal between the tube and the pipe. The wall and the fence are extended from the base panel and are preferably formed as an integral piece with the base panel, for allowing the plug to be is solidly secured between the tube and the pipe when the tube is rotated and moved toward the pipe.

The plug may either include a blind structure to block the tube and the pipe, or may include an orifice formed therein and communicating the bores of the tube and the pipe with each other, for allowing air or coolant or cleaning agent or water to flow through the pipe and the tube. The plug may include a cavity formed therein for receiving the first end of the tube.

The pipe includes a first end having an angled inner peripheral surface formed therein, the plug includes a first end having an angled outer peripheral surface formed thereon to engage with the angled inner peripheral surface of the pipe, and to make a seal between the plug and the pipe. The first end of the plug may thus be centered and solidly engaged in the first end of the pipe by the engagement of the inclined or angled surfaces of the pipe and the plug.

The plug may include a stud extended therefrom and engageable into the bore of the tube, for solidly securing to the tube. A valve may further be provided and coupled to the pipe, and a pressure gauge and a control device and a coupler may be optionally or selectively coupled to the valve for pressure measuring purposes, or for controlling the valve, or for coupling to various piping systems.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
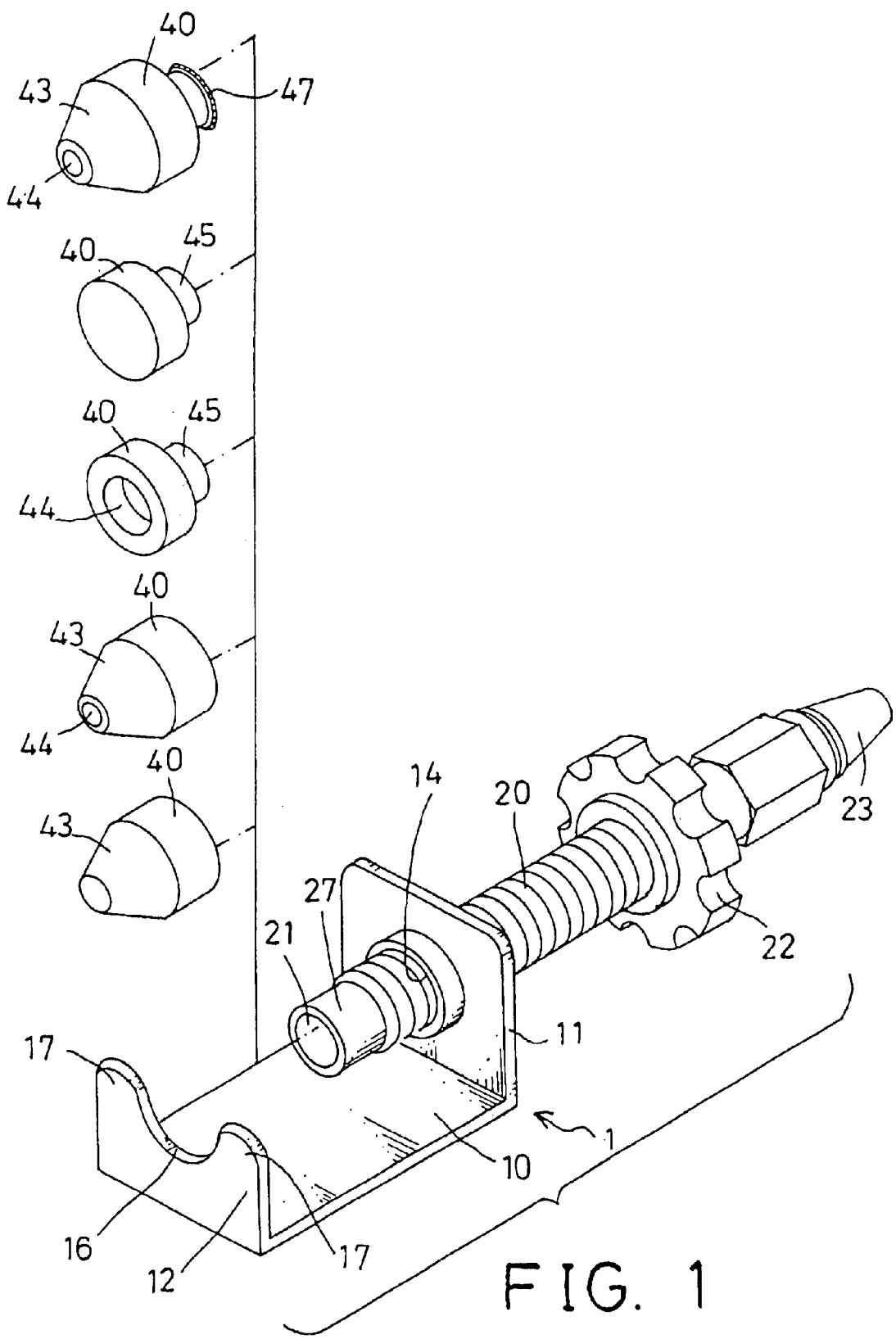
FIG. 1 is a partial exploded view of an adapter device in accordance with the present invention.
Figure 2:
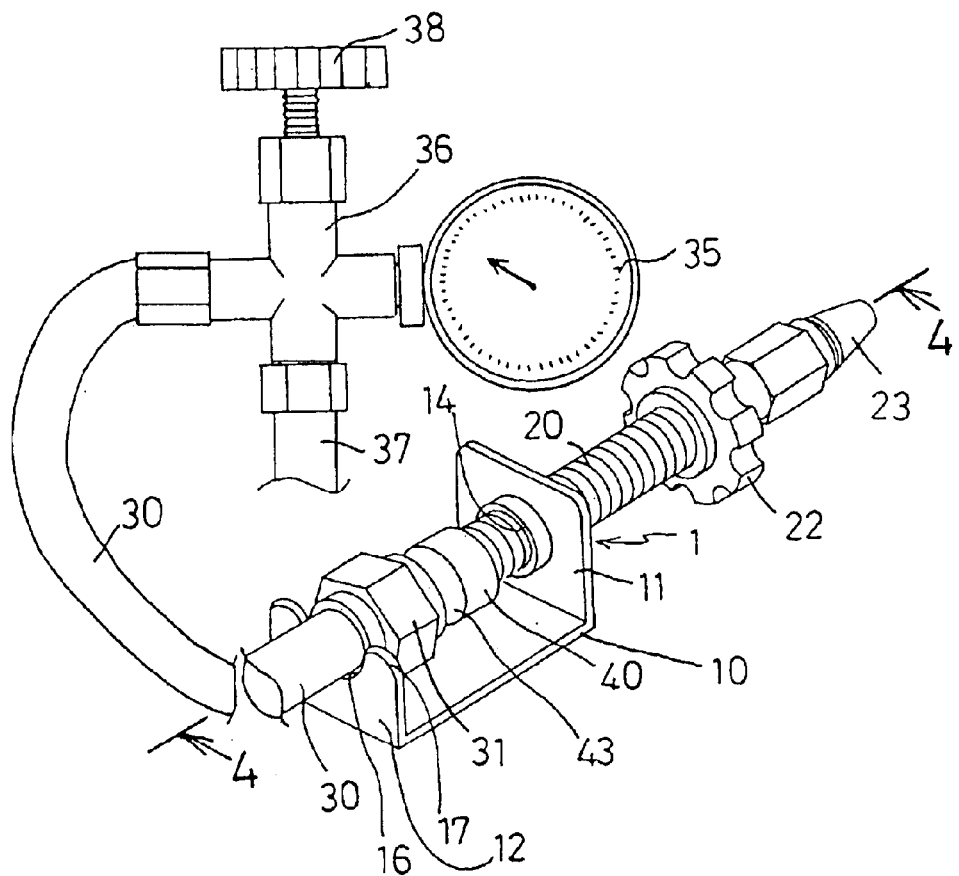
FIG. 2 is a partial perspective view illustrating the operation of the adapter device.

Referring to the drawings, and initially to FIGS. 1–4, an adapter device in accordance with the present invention comprises a bracket 1 including a base panel 10 having a wall 11 extended from one end of the base panel 10, and a fence 12 extended from the other end of the base panel 10. It is preferable that the wall 11 and the fence 12 are substantially perpendicular to the base panel 10 of the bracket 1, and are parallel to each other.

The wall 11 of the bracket 1 includes a screw hole or an inner thread 14 formed therein for threading with a threaded tube 20 which includes a bore 21 formed therein for receiving air, coolant, or the like therein. A knob 22 is attached or secured to the tube 20 for rotating the tube 20 relative to the wall 11 of the bracket 1, and thus for moving one end 27 of the tube 20 toward and away from the fence 12 of the bracket 1.

The tube 20 includes a coupler or a connector 23 attached or provided on the other end thereof, for coupling to a hose 24 or the other parts or elements, of such as the air pump facilities, the refrigerant recovery systems, the coolant circulating systems or the air conditioning systems of vehicles or the like.

The fence 12 of the bracket 1 includes an opening 16 formed therein and formed or defined by two arms 17. A pipe 30 is to be coupled to the tube 20, and may be easily received or engaged into the opening 16 of the fence 12 of the bracket 1. The pipe 30 may include a fastener or a stop 31 formed or provided or attached thereto for engaging with the fence 12, and for preventing the stop 31 and the pipe 30 from moving relative to the fence 12.

The pipe 30 includes a bore 33 formed therein and to be coupled or connected to the bore 21 of the tube 20, and includes a tapered or inclined or angled inner peripheral surface 34 formed in one end thereof. The fastener or the stop 31 may be formed integral with the pipe 30 (FIG. 4), or threaded onto the pipe 30 (FIG. 5), or secured onto the pipe 30, for positioning the pipe 30 to the fence 12 of the bracket 1.

The pipe 30 may be coupled to a pressure gauge 35 via a valve 36 which may be coupled to coolant reservoirs, air conditioning systems, cleaning systems, or the like via a coupler 37, and which may be controlled or operated or actuated by a control device 38 or the like. For example, cleaning agents and/or water may be supplied into the pipe 30, and then to be supplied to the tube 20 of various piping systems.

Figure 4:
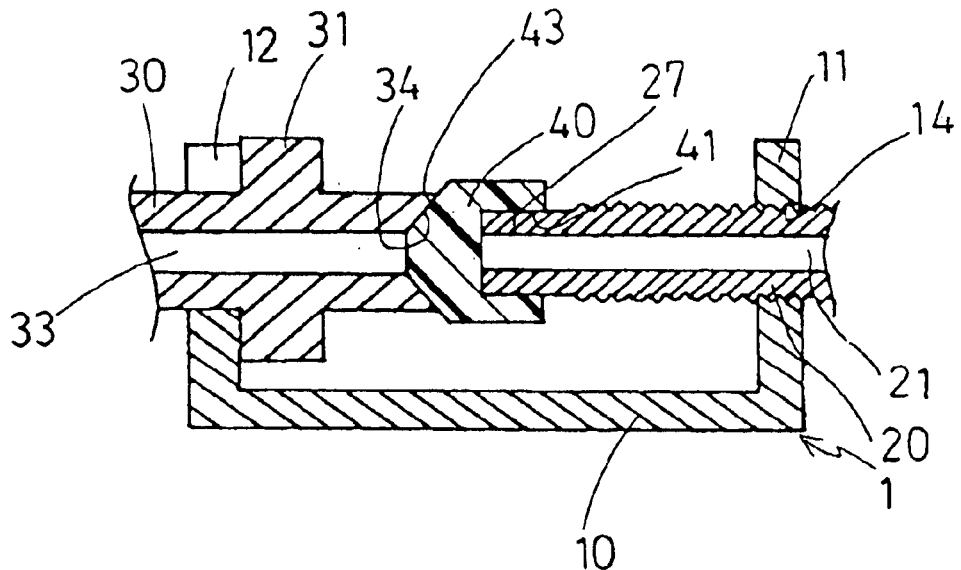
FIG. 4 is a cross sectional view taken along lines 4—4 of FIG. 2.

One or more plugs 40 may be provided and selectively engaged between the tube 20 and the pipe 30, for either coupling or connecting the tube 20 and the pipe 30 together (FIG. 5), or for blocking the tube 20 and the pipe 30 (FIG. 4). For example, as shown in OS FIGS. 4, 5, some of the plugs 40 may include a cavity 41 formed therein for receiving the one end 27 of the tube 20, and thus for attaching or securing the plugs 40 onto the end 27 of the tube 20.

Some of the plugs 40 may include a cone or frustum shaped structure or inclined or angled outer peripheral surface 43 formed on the other end thereof for engaging with the corresponding angled inner peripheral surface 34 of the pipe 30, and thus for snugly fitting with the pipe 30. The plugs 40 are preferably made of resilient rubber or synthetic materials, or the like, for making a water-tight or air-tight seal with the tube 20 and the pipe 30.

Figure 5:
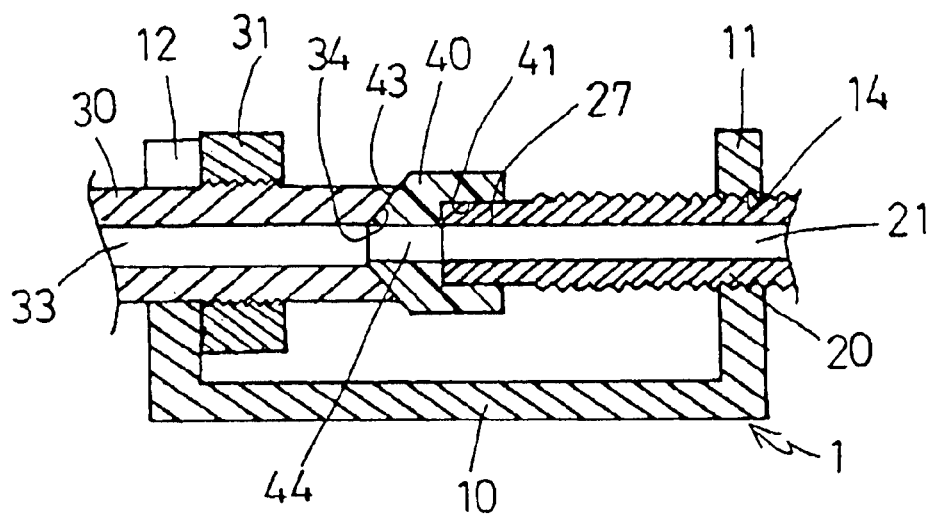
FIG. 5 is a cross sectional view similar to FIG. 4, illustrating the other arrangement or application of the adapter device.

As shown in FIG. 5, some of the plugs 40 may include an orifice 44 formed therein and communicating with the cavity 41 thereof for communicating the bores 21, 33 of the tube 20 and the pipe 30 together. Alternatively, the plugs 40 may be blinded or may include a blinded structure for blocking the tube 20 and the pipe 30, and for preventing air or coolant from flowing through the tube 20 and the pipe 30.

As shown in FIG. 1, the other plugs 40 may include a stud 45 extended therefrom for engaging into the bore 21 of the tube 20, and may also include an orifice 44 formed therein for communicating the bores 21, 33 of the tube 20 and the pipe 30 together, or may be blinded for blocking the tube 20 and the pipe 30. The plugs 40 may be solidly engaged or secured between the tube 20 and the pipe 30 by threading or moving the tube 20 relative to the wall 11 and toward the fence 12 or toward the pipe 30.

As also shown in FIG. 1, the further plugs 40 may include a connector 47 attached or provided on one end thereof for securing or coupling or latching to the end 27 of the tube 20.

In operation, as shown in FIG. 5, when the plug 40 engaged between the tube 20 and the pipe 30 includes an orifice 44 formed therein for communicating or for coupling the bores 21, 33 of the tube 20 and the pipe 30 together, air or coolant or cleaning agents or water may be supplied into the tube 20 and the pipe. 30 via such as the coupler 37 and the valve 36.

Alternatively, when the plug 40 has no orifice formed therein and is blocked between the tube 20 and the pipe 30, the pipe 30 may be coupled to the piping systems for testing or measuring the pressure in the piping systems with such as the pressure gauge 35.

Figure 3:
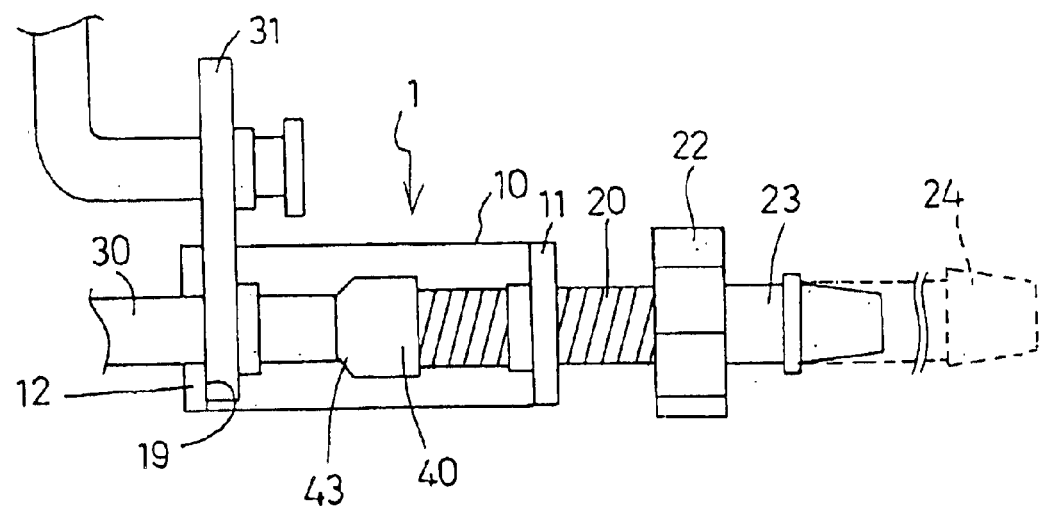
FIG. 3 is a partial plan schematic view illustrating the other arrangement or application of the adapter device.

As shown in FIG. 3, the fence 12 of the bracket 1 preferably includes a flat inner surface 19 provided therein, for allowing various stops 31 of greater sizes or lengths or widths to be received in the bracket 1 and to be engaged with the flat inner surface 19 of the fence 12. Various stops 31 may thus be easily attached or engaged onto the fence 12, and thus be solidly secured or retained to the bracket 1.

Accordingly, the adapter device in accordance with the present invention may be used for readily and solidly coupling pipes or hoses together and for receiving cleaning agents and/or water therein, and for selectively blocking the pipes or hoses, and for testing or measuring the pressure in the pipes or hoses.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An adapter device comprising:

a bracket including a base panel having a wall and a fence integrally extended therefrom, said fence of said bracket including an opening formed therein and defined by two arms, a tube threaded to said wall of said bracket, and including a first end located between said wall and said fence, and movable toward and away from said fence when said tube is rotated relative to said wall of said bracket, said tube including a bore formed therein, a pipe engaged in said opening of said fence, and including a stop provided thereon for engaging with said fence and for positioning said pipe to said fence of said bracket, said pipe including a bore formed therein, a plug selectively engaged between said tube and said pipe, and to be secured between said tube and said pipe when said tube is rotated and moved toward said pipe, and at least one second plug selectively and changeably engaged between said tube and said pipe, when said plug is disengaged from said tube and said pipe.

2. The adapter device according to claim 1, wherein said plug includes a blind structure to block said tube and said pipe.

3. The adapter device according to claim 1, wherein said plug includes an orifice formed therein and communicating with said bores of said tube and said pipe with each other.

4. The adapter device according to claim 1, wherein said plug includes a cavity formed therein for receiving said first end of said tube.

5. The adapter device according to claim 1, wherein said pipe includes a first end having an angled inner peripheral surface formed therein, said plug includes a first end having an angled outer peripheral surface formed thereon to engage with said angled inner peripheral surface of said pipe, and to make a seal between said plug and said pipe.

6. The adapter device according to claim 1, wherein said plug includes a stud extended therefrom and engageable into said bore of said tube.

7. The adapter device according to claim 1 further comprising a valve coupled to said pipe.

8. The adapter device according to claim 7 further comprising a pressure gauge coupled to said valve for pressure measuring purposes.

9. The adapter device according to claim 7 further comprising a control device coupled to said valve to control said valve.

10. The adapter device according to claim 7 further comprising a coupler coupled to said valve for coupling to piping systems.

* * * * *